United States Patent [19]
Kato

[11] Patent Number: 5,776,283
[45] Date of Patent: Jul. 7, 1998

[54] MANUFACTURING METHOD OF SWITCH SHEET AND APPARATUS THEREOF

[75] Inventor: Teruyuki Kato, Settsu, Japan

[73] Assignees: Kabushiki Kaisha Kato Seiko; Hosiden Corporation, both of Osaka, Japan

[21] Appl. No.: 656,325

[22] PCT Filed: Oct. 11, 1995

[86] PCT No.: PCT/JP95/02094

§ 371 Date: Jun. 11, 1996

§ 102(e) Date: Jun. 11, 1996

[87] PCT Pub. No.: WO96/11794

PCT Pub. Date: Apr. 25, 1996

[30] Foreign Application Priority Data

Oct. 14, 1994 [JP] Japan ................................. 6-249603

[51] Int. Cl.⁶ ........................................................ B32B 31/18
[52] U.S. Cl. .................. 156/249; 156/247; 156/248; 156/253; 156/267; 156/270; 156/324; 156/510; 156/513; 156/543
[58] Field of Search ........................... 156/247, 248, 156/249, 250, 253, 267, 269, 270, 324, 510, 513, 555, 459, 289, 543; 200/516

[56] References Cited

U.S. PATENT DOCUMENTS 5,451,285  9/1995  Santo et al. .................. 156/289 X

FOREIGN PATENT DOCUMENTS 1-200525  8/1989  Japan .
5-89739   4/1993  Japan .

*Primary Examiner*—Curtis Mayes
*Attorney, Agent, or Firm*—Seed and Berry LLP

[57] ABSTRACT

The present invention is provided with an automatic manufacturing method of a switch sheet comprising a concave face switch and an apparatus thereof.

A refuse removing tape 7 is stuck on a lower surface of a film separator 4 so that an adhesive layer thereof may fit it before a first punch device 14 forms first holes in the film separator 4. Then, a processing tape 5 is stuck on an upper surface of the film separator 4 so that an adhesive layer of the processing tape may fit it before a second punch device 15 punches the processing tape 5 in a setting shape at the same time while forming second holes through the processing tape 5, the film separator 4 and the refuse removing tape 7. After that, the punched processing tape is wound to be stripped when pulling out the film separator 4 and the refuse removing tape 7 on which the processing tape 5 in a setting shape is stuck.

9 Claims, 3 Drawing Sheets

5,776,283

1

MANUFACTURING METHOD OF SWITCH SHEET AND APPARATUS THEREOF

BACKGROUND OF THE INVENTION

1. Field of the Invention

The present invention relates to a manufacturing method of switch sheet and an apparatus thereof which is a component part of a concave face switch used for a portable telephone or the like.

2. Description of the Prior Art

A portable telephone has recently been come into wide use in accordance with realizing compactness and low price wherein a various studies are advanced so that thinner, more compact, more lightweight and cheaper one than the prior ones can be provided.

For example, as to a switch used for making contact points of ten keys of a portable telephone and a various kind of function keys or the like be conducted, a concave face switch 1 illustrated in FIG. 3 is adopted instead of a silicon rubber switch (see FIG. 4) and a membrane switch adopted at the beginning, whereby a thickness can be thin, mechanically stable touch can be obtained and it is easy to use it because a timing of a mechanical reverse is equal to one of an electrical touch. The concave face switch 1 comprises a switch sheet 2 on which a metallic dome 3 is stuck, wherein the metallic dome is directly arranged on a base arranged at the portable telephone body, thereby constructing contact point which is made to be conducted electrically.

First, the switch sheet 2 included by the concave face switch 1 has a state wherein, as shown in FIG. 2, fixing holes 4a, holes 4b for deciding a position, holes 4c for exposing dome and LED lighting holes 4d are formed in a film separator 4 by a punch and the like while holes 5a for deciding a position and LED lighting holes 5b are formed in a processing tape 5 (sticking tape) by a punch and the like, a processing tape 5 is manually stuck in the film separator 4 by an operator, thereby producing it, so as to coincide holes for deciding a position 4b with 5a, i.e., so as to coincide the LED lighting holes 4d with 5b and a protective liner 6 is stuck on a back surface side thereof, leading to supplying it with a processing maker. In the switch sheet 2 delivered to the processing maker in this way, the metallic dome 3 is manually stuck on a back surface (adhesive layer) of the processing tape 5 by the operator one by one through holes 4c for exposing dome of the film separator 4, thereby manufacturing the concave face switch 1. After that, a surface sheet on which numerals and symbols of various kinds of functions and alphabet or the like are printed is stuck on a surface of the switch sheet 1 before being fixed in the portable telephone body through the fixing hole 4a thereof.

As mentioned above, a method in which the switch sheet which the concave face switch comprises is manufactured by means of sticking manually the film separator on the processing tape by the operator has problems that a gap of position easily occurs, a yield is low and an amount of production is limited. Therefore, it is tried to manufacture automatically switch sheets, however, it is a present status not to bring into a result satisfied technically.

In other words, as shown in FIG. 2, various kinds of holes formed in the film separator are not always coincided with various kinds of holes formed in the processing tape, whereby it is required to form holes respectively and separately in the film separator and the processing tape. In case of forming various kinds of holes in the processing tape, a

2 back surface of the processing tape has an adhesive layer to stick the metallic dome, wherein, in case of forming holes after feeding it as it is, the adhesive layer is stuck on a side of an apparatus, thereby making it impossible to continue an operation thereafter. Thus, though it can be thought that holes are formed in the film separator before holes are formed in the processing tape by means of piling the processing tape thereon, there is a case wherein some kinds of switch sheets require that holes are formed in only the processing tape so as to be partially overlapped with the holes formed in the film separator. In this case, holes formed in the film separator in advance make it impossible to have reaction force of blade such as a punch or the like in an overlapped portion, thereby causing a problem wherein holes of the processing tape cannot surely be opened.

Taking the above problems into consideration, the present invention provides a manufacturing method of a switch sheet and an apparatus thereof which can be automatically manufactured a switch sheet which a concave face switch comprises.

SUMMARY OF THE INVENTION

In a manufacturing method of a switch sheet according to the present invention, a refuse removing tape for removing refuses is stuck on a lower surface of a film separator via an adhesive layer of the refuse removing tape, before one or a plurality of first holes are formed in the film separator and then, a processing tape is stuck on an upper surface of the film separator piled on the refuse removing tape via an adhesive layer of the processing tape before the processing tape is punched in a setting shape at the same time while one or a plurality of second holes are formed through at least the processing tape or both of the processing tape and film separator, and the processing tape, the film separator and the refuse removing tape are fed integratively while the punched processing tape is rolled for stripping.

Moreover, a manufacturing apparatus of a switch sheet according to the present invention comprises a feeding reel for feeding a film separator, a feeding reel for feeding a refuse removing tape, a first punch device including a processing metal mold for forming one or a plurality of holes in the film separator piled on the refuse removing tape, a feeding reel for feeding a processing tape, a second punch device including a processing metal mold for punching the processing tape, piled on the film separator by the second sticking means, in a setting shape, and for forming one or a plurality of holes through the processing tape, the film separator and the refuse removing tape, a winding device for winding the punched processing tape, and a feeder for feeding together the processing tape punched in a setting shape, the film separator and the refuse removing tape, wherein the first punch device forms the first holes in the film separator, and the second punch device punches the processing tape in a setting shape and simultaneously forms the second holes in at least the processing tape or both of the processing tape and film separator.

After the refuse removing tape is stuck on the lower surface of the film separator via the adhesive layer of the refuse removing tape, the first holes are formed in the film separator. Then, the processing tape is stuck on the upper surface of the film separator piled on the refuse removing tape via the adhesive layer of the processing tape, before the processing tape is punched in a setting shape at the same time while the second holes are formed through at least the processing tape or both of the processing tape and the film separator. In feeding the film separator and the refuse removing tape on which the processing tape having the setting shape is stuck, the punched processing tape is wound for stripping.

As a result, a switch sheet including holes, respectively formed corresponding to the processing tape and the film separator, can be automatically manufactured.

DETAILED DESCRIPTION OF THE PREFERRED EMBODIMENTS

Referring now to the figures, an embodiment of the invention is described in detail below.

Figure 1:
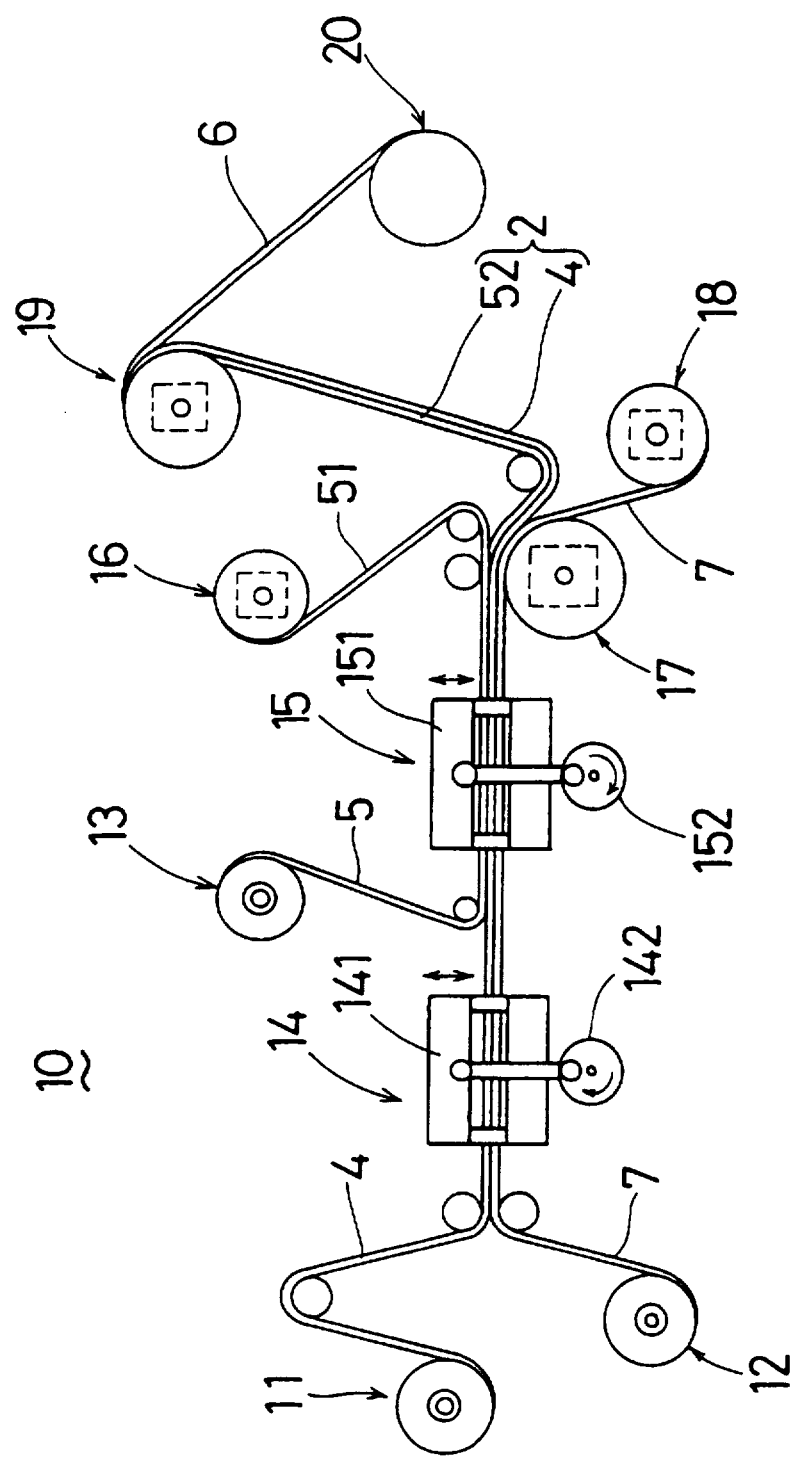
FIG. 1 is a schematic descriptive view illustrating a manufacturing apparatus of a switch sheet according to the present invention.
Figure 2:
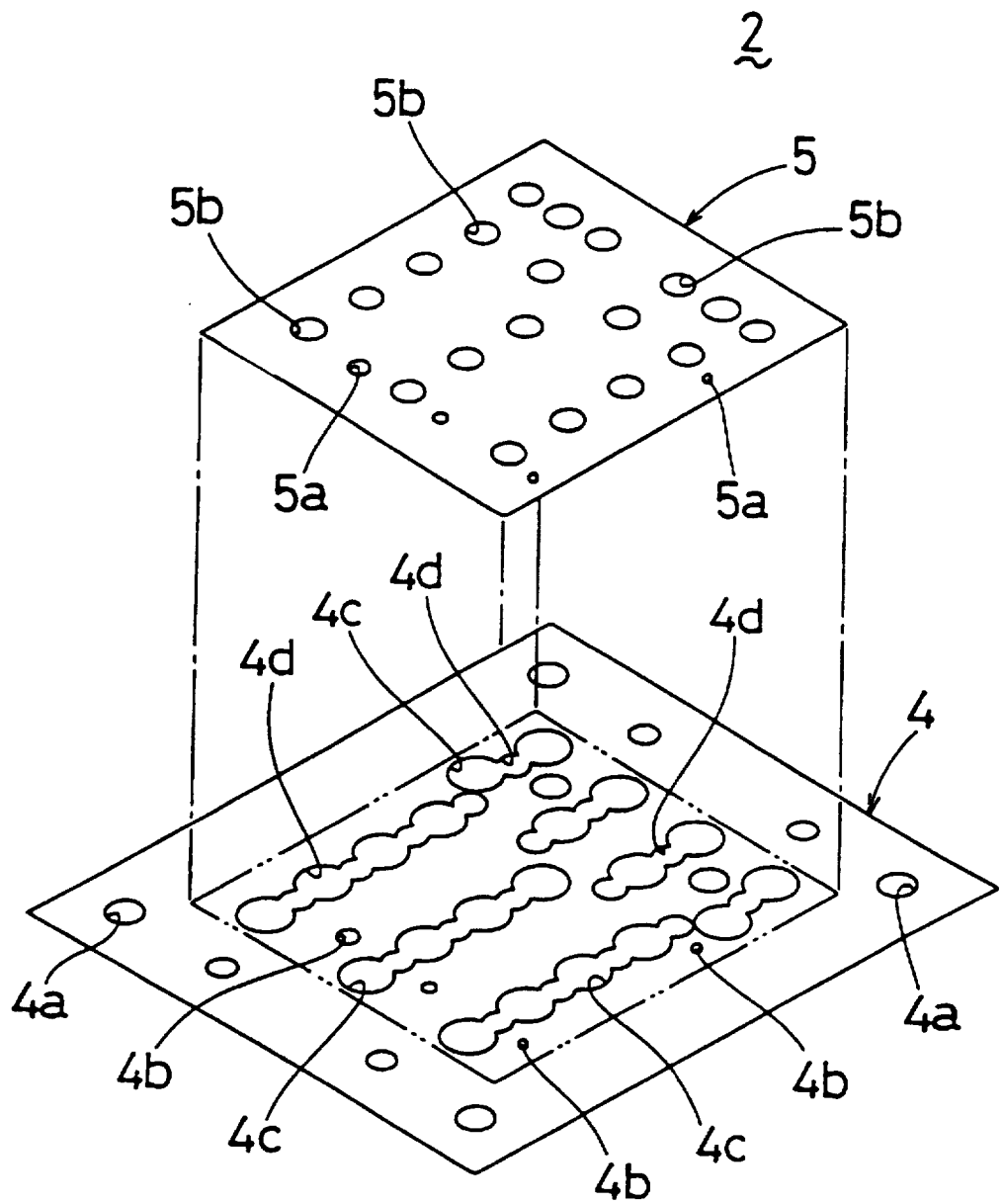
FIG. 2 is a exploded perspective view illustrating a switch sheet.
Figure 3:
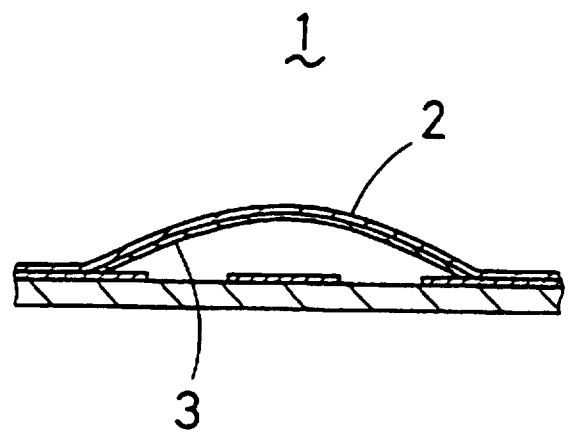
FIG. 3 is a sectional view of a concave face switch.
Figure 4:
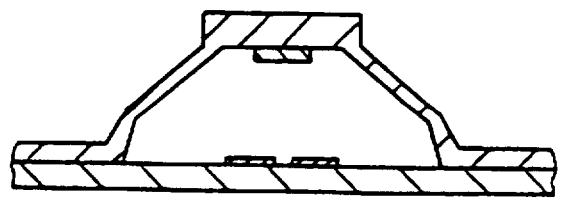
FIG. 4 is a sectional view of a rubber switch.

In FIG. 1, a manufacturing apparatus 10 of a switch sheet 2 according to the present invention is illustrated, which comprises a feeding reel 11 for feeding a film separator 4 in a rolling state, a feeding reel 12 for feeding a refuse removing tape (adhesive tape) 7 in a rolling state, a feeding reel 13 for feeding a processing tape (adhesive tape) 5 in rolling state, a first punch device 14 for forming various kinds of first holes in the film separator 4 piled on the refuse removing tape 7, a second punch device 15 for punching the processing tape 5 in a setting shape, piled on the film separator 4 on the refuse removing tape 7 and simultaneously for forming various kinds of second holes through the processing tape 5, the film separator 4 and the refuse removing tape 7, a winding device 16 for winding a processing tape 51 as a punching mark wherein a setting shape has been punched, a feeder 17 for holding a processing tape 52 in a setting shape, the film separator 4 and the refuse removing tape 7 and pulling them out, a winding device 18 for winding the refuse removing tape 7, a winding device 19 for winding the processing tape 52 including various kinds of formed holes, in a setting shape, and the switch sheet 2 on which the processing tape 52 including various kinds of formed holes is stuck, and a feeding reel 20 for feeding a protective liner 6 (a mold releasing paper) stuck on a back surface of the switch sheet 2.

The refuse removing tape 7 is fit in the feeding reel 12 to turn an adhesive layer thereof toward an upper surface so that the adhesive layer thereof may stick on a lower surface of the film separator 4, and the processing tape 5 is fit in the feeding reel 13 to turn the adhesive layer thereof toward a lower surface so that the adhesive layer thereof may stick on an upper surface of the film separator 4. On the other hand, the first punch device 14 and the second punch device 15 comprises respectively processing metal molds 141, 151 and crank devices 142, 152 to make the processing metal molds 141, 151 rise and fall, wherein a height of each blade arranged at the processing metal molds 141, 151 and a stroke for rising and falling of each crank device 142, 152 form various kinds of the first holes in only the film separator 4 in the first punch device 14 and they punch only the processing tape 5 in a setting shape in the second punch device 15 at the same time while they form various kinds of the second holes through the processing tape 52 punched in the setting shape, the film separator 4 and the refuse removing tape 7

Moreover, the winding device 16 for winding the processing tape 51, the feeder 17 for feeding the processing tape 52 in the setting shape piled on the film separator 4 on the refuse removing tape 7, the winding device 18 for winding the refuse removing tape 7 and the winding device 19 for winding the switch sheet 2 include respectively motors which are not shown in Figures, each of which is synchronized for operation. In other words, when the punch apparatus 14, 15 are operated with the result that the processing metal molds 141, 151 fall, the winding devices 16, 18, 19 and the feeder 17 stop, on the other hand, when the processing metal molds 141, 151 rise, the feeder 17 is operated with the result that a portion of a set length of the processing tape 5 piled on the film separator 4 on the refuse removing tape 7 is pulled out, whereby the winding devices 16, 18 and 19 are respectively operated to wind each of the processing tape 51, the refuse removing tape 7 and the switch sheet 2 at the same length.

Then, the manufacturing apparatus 10 having such a structure is employed to manufacture the switch sheet 2, which is described. First, roll bodies of the film separator 4, the refuse removing tape 7 and the processing tape 5 are fit in the feeding reels 11, 12, 13 toward each set direction before each edge is pulled out to decide their positions on a center line, thereby limiting deviations of right or left direction to their feeding directions by a limiting roller which is not shown. And the film separator 4 is laid on the adhesive layer of the refuse removing tape 7 to be stuck each other thereby making it pass through the first punch device 14. Next, on the film separator 4 piled on the refuse removing tape 7, the processing tape 5 is laid to be stuck before making it pass through the second punch device 15 so as to be led to the feeder 17 and held therebetween. Thus, the processing tape 5, the film separator 4 and the refuse removing tape 7 are stuck in order of the upper to be incorporated before the feeder 17 is operated, thereby enabling each of the processing tape 5, the film separator 4 and the refuse removing tape 7 to be pulled out at the same length.

Then, when the processing tape 5, the film separator 4 and the refuse removing tape 7 which are integratively stuck are fed through the feeder 17, the refuse removing tape 7 is separated from the film separator 4, thereby sticking the edge thereof on the winding device 18 for winding. On the other hand, the processing tape 5 and the film separator 4 from which the refuse removing tape 7 are separated are stuck on the protective liner 6 which is fed from the feeding reel 20 on a side of the film separator 4 to be incorporated with the result that it is wound by the winding device 19.

By the way, the film separator 4 and the refuse removing tape 7 are integratively stuck, wherein, when the first punch device 14 is operated, the processing metal mold 141 rises and falls according to a stroke portion thereof through the crank device 142, thereby forming various kinds of the first holes in only the film separator 4. In this case, the punched refuses of the punched film separator 4 are stuck on the adhesive layer of the refuse removing tape 7.

Then, when an operation for punching holes by the first punch device 14 is completed, the processing tape 5 is stuck on the film separator 4. The processing tape 5, the film separator 4 and the refuse removing tape 7 are integratively stuck, wherein, when the second punch device 15 is operated, the processing metal mold 151 rises and falls according to a stroke portion thereof through the crank device 152 thereby punching only the processing tape 5 in a setting shape, at the same time while various kinds of the second holes are formed through the processing tape 5, the film separator 4 and the refuse removing tape 7. Thus, the operation of punching holes by the second punch device 15 is completed, the processing tape 5, the film separator 4 and the refuse removing tape 7 which are fed through the feeder 17 wind the processing tape 5 through the winding device 16, whereby the punched refuse portions 51 wherein the setting shape is punched by the processing metal mold 151 is stripped from the film separator 4 to be wound. On the other hand, the punched processing tape 52 of the setting shape is stuck on the film separator 4 through the adhesive layer thereof.

In the same way, the processing tape 5, the film separator 4 and the refuse removing tape 7 are fed through the feeder 17, wherein the refuse removing tape 7 is wound through the winding device 18 whereby the refuse removing tape 7 is stripped from the film separator 4 to be wound. In this case, the punched refuses of the film separator 4 punched by the first punch device 14 are stuck on the adhesive layer of the refuse removing tape 7, wherein, at this time, various kinds of the first holes formed by the first punch device 14 are opened. As a result, even if, the second holes formed by the second punch device 15 in the processing tape 5 is partially overlapped with the first holes formed by the first punch device 14 in the film separator 4, the punched refuses of the film separator 4 is stuck on the refuse removing tape 7 without removing, whereby, in an operation of making holes of the processing tape 5, the punched refuses enables reaction force of the processing metal mold 151 to be held, thereby ensuring forming the holes in the processing tape 5.

Then, the switch sheet 2 comprising the processing tape 52, in a setting shape, wherein various kinds of holes are formed and the film separator 4 wherein various kinds of holes are formed is wound through the winding device 19 so as to manufacture the roll shaped switch sheet 2. At this time, it is wound together with the protective liner 6 on the side of the film separator 4 in order to give a protection so that dusts or the like may not be adhered to the adhesive layer of the partially exposed processing tape 52 i.e., the adhesive layer for sticking the metallic dome 3 by the holes formed in the film separator 4.

The switch sheet 2 manufactured in this way is supplied to a processing maker, the protective liner 6 is removed before the metallic dome 3 is stuck on the back surface (adhesive layer) of the processing tape 52 exposed through the holes formed in the film separator 4, thereby manufacturing the concave face switch 1.

Furthermore, if a client is desired, there is a case that the processing tape 5, the film separator 4 and the refuse removing tape 7, wherein operations of punching holes by the punch apparatus 14 and 15 are completed without sticking the protective liner 6, are integratively piled to be wound as they, and formed in a roll shape so as to be shipped to the processing maker. In this case, the processing maker strips the refuse removing tape 7 with the result that the switch sheet 2 can be obtained.

Though the present embodiment shows an illustration wherein the second punch device 15 is operated to form the second holes through the processing tape 5, the film separator 4 and the refuse removing tape 7, it may punch the holes in only the processing tape 5, or through the processing tape 5 and the film separator 4 by adjusting the height of the blade and the rising and falling stroke of the processing metal mold 141 of the second punch device 15.

As mentioned above, according to the manufacturing method of the switch sheet of the present invention, the switch sheet, wherein the holes respectively corresponding to the film separator and the processing tape are formed, can be automatically manufactured without assistance.

According to the manufacturing method of the switch sheet of the present invention, a combination of a simple structure enables the switch sheet including respectively the necessary holes in the processing tape and the film separator to be continuously manufactured.

Industrial Applicability

As is described above, the present invention is suitable for manufacturing the switch sheet which is a component part of the concave face switch used in the portable telephone or the like.

What is claimed is:

1. A manufacturing method of a switch sheet comprising the steps of:

sticking a refuse removing tape having an upper surface and a lower surface on a lower surface of a film separator via an adhesive layer formed on the upper surface of the refuse removing tape, forming one or a plurality of first holes in the film separator piled on the refuse removing tape, sticking a processing tape having an upper surface and a lower surface on an upper surface of the film separator piled on the refuse removing tape via an adhesive layer formed on the lower surface of the processing tape, punching the processing tape in a setting shape, and simultaneously forming one or a plurality of second holes through at least the processing tape or both of the processing tape and the film separator, and stripping refuse portions of the processing tape after being punched in a setting shape off the upper surface of the film separator.

2. A manufacturing method of a switch sheet according to claim 1, further comprising a step of stripping the refuse removing tape off the lower surface of the film separator after stripping the refuse portions of the processing tape off the upper surface of the film separator.

3. A manufacturing method of a switch sheet according to claim 2, further comprising a step of winding the film separator together with a protective liner on the lower surface thereof after stripping the refuse removing tape off the lower surface of the film separator.

4. A manufacturing method of a switch sheet comprising the steps of:

sticking a refuse removing tape having an upper surface and a lower surface on a lower surface of a film separator via an adhesive layer formed on the upper surface of the refuse removing tape, forming one or a plurality of first holes in the film separator piled on the refuse removing tape, sticking a processing tape having an upper surface and a lower surface on an upper surface of the film separator piled on the refuse removing tape via an adhesive layer formed on the lower surface of the processing tape, punching the processing tape in a setting shape, and simultaneously forming one or a plurality of second holes through at least the processing tape or both of the processing tape and the film separator, feeding integratively the processing tape, the film separator and the refuse removing tape, and stripping refuse portions of the processing tape after being punched in a setting shape off the upper surface of the film separator.

5. A manufacturing method of a switch sheet according to claim 4 further comprising a step of stripping the refuse removing tape off the lower surface of the film separator after stripping the refuse portions of the processing tape off the upper surface of the film separator.

6. A manufacturing method of a switch sheet according to claim 5 further comprising a step of winding the film separator together with a protective liner on the lower surface thereof after stripping the refuse removing tape off the lower surface of the film separator.

7. A manufacturing apparatus of a switch sheet comprising:

a feeding reel for feeding a film separator, a feeding reel for feeding a refuse removing tape having an upper surface and a lower surface, the upper surface having an adhesive layer thereon, a first sticking means, positioned at subsequent stages of the both feeding reels, for sticking the refuse removing tape on a lower surface of the film separator via the adhesive layer of the refuse removing tape, a first punch device, positioned at a stage of subsequent to the first sticking means, having a processing metal mold for forming one or a plurality of first holes in the film separator piled on the refuse removing tape by the sticking means, a feeding reel for feeding a processing tape having an upper surface and a lower surface, the lower surface having an adhesive layer thereon, a second sticking means, positioned at a stage subsequent to the first punch device, for sticking the processing tape on an upper surface of the film separator in a state piled on the refuse removing tape forwarded from the first punch device via the adhesive layer of the processing tape, a second punch device including a processing metal mold for punching the processing tape, piled on the film separator by the second sticking means, in a setting shape, and for forming one or a plurality of second holes through the processing tape, the processing tape and the film separator, or the processing tape, the film separator and the refuse removing tape, a winding device, positioned at a stage subsequent to the second punch device, for winding refuse portions of the processing tape punched by the second punch device, and a feeder, positioned at a stage subsequent to the winding device, for feeding integratively the processing tape punched in a setting shape, the film separator and the refuse removing tape, wherein the first punch device forms the first holes in the film separator, and the second punch device punches the processing tape in a setting shape and simultaneously forms the second holes in at least the processing tape or both of the processing tape and the film separator.

8. A manufacturing apparatus of a switch sheet according to claim 7 further comprising a refuse removing tape winding device, positioned at a stage subsequent to the feeder, for stripping the refuse removing tape off the film separator, and for winding the refuse removing tape.

9. A manufacturing apparatus of a switch sheet according to claim 8 further comprising a feeding reel, positioned at a stage subsequent to the refuse removing tape winding device, for feeding a protective liner, and a winding device for winding the film separator together with the protective liner, fed from the reel, on a lower surface of the film separator.

* * * * *